(12) United States Patent
Yoshida et al.

(10) Patent No.: US 7,130,752 B2
(45) Date of Patent: Oct. 31, 2006

(54) MEASURING-INSTRUMENT REMOTE-CALIBRATION SYSTEM AND MEASURING-INSTRUMENT REMOTE-CALIBRATION METHOD

(75) Inventors: Haruo Yoshida, Tsukuba (JP); Hirokazu Matsumoto, Tsukuba (JP); Yoshio Hino, Tsukuba (JP); Masaru Arai, Tsukuba (JP); Masataka Nakazawa, Miyagi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/697,321

(22) Filed: Oct. 31, 2003

(65) Prior Publication Data

US 2004/0215412 A1    Oct. 28, 2004

(30) Foreign Application Priority Data

Apr. 28, 2003    (JP) .............................. 2003-123782

(51) Int. Cl.
G01D 18/00    (2006.01)
H04B 1/04    (2006.01)

(52) U.S. Cl. ........................................ 702/85; 455/130
(58) Field of Classification Search .................. 702/85; 455/130, 63.3, 67.13; 73/1.01, 1.03
See application file for complete search history.

(56) References Cited

U.S. PATENT DOCUMENTS

| | | | | |
|---|---|---|---|---|
| 4,607,257 A | * | 8/1986 | Noguchi | 340/825.69 |
| 5,469,442 A | * | 11/1995 | Seligmann et al. | 340/870.04 |
| 5,734,713 A | * | 3/1998 | Mauney et al. | 379/395 |
| 5,812,084 A | * | 9/1998 | Bonanni et al. | 342/352 |
| 6,289,237 B1 | * | 9/2001 | Mickle et al. | 600/509 |
| 6,421,120 B1 | * | 7/2002 | Wildnauer | 356/243.1 |
| 6,453,042 B1 | * | 9/2002 | Roach et al. | 379/395 |
| 6,594,198 B1 | * | 7/2003 | Amaral et al. | 367/13 |
| 6,615,024 B1 | * | 9/2003 | Boros et al. | 455/67.14 |
| 6,615,074 B1 | * | 9/2003 | Mickle et al. | 600/509 |
| 6,654,590 B1 | * | 11/2003 | Boros et al. | 455/67.14 |
| 6,668,161 B1 | * | 12/2003 | Boros et al. | 455/67.14 |
| 6,778,924 B1 | * | 8/2004 | Hanse | 702/88 |

FOREIGN PATENT DOCUMENTS

TW    475181 A    *    2/2002

OTHER PUBLICATIONS

Lombardi, Automation of NIST Frequency Calibration at Remote Sites, 1999 IEEE, pp. 618-622.*
Jeanneret et al., High Precision Comparison Between SNS and SIS Josephson Voltage Standard, Apr. 2001, IEEE Transactions on Instrumentation and Measurements, vol. 50, No. 2, pp. 188-209.*
Muller et al., Optimized 1 V and 10 V Josephson Series Arrays, Apr. 1997, IEEE Transactions on Instrumentation and Measurement, vol. 46, No. 2, pp. 229-232.*

(Continued)

Primary Examiner—Bryan Bui
Assistant Examiner—Toan M. Le
(74) Attorney, Agent, or Firm—Sughrue Mion, PLLC (57) ABSTRACT

In a measuring-instrument remote-calibration system and measuring-instrument remote-calibration method, a measuring standard quantity is converted into a parameter adapted for communication, or based on measuring standard quantity, a parameter adapted for communication is generated and sent to a remote place. Alternatively, when the measuring standard quantity is not suitable for communication, it is converted into a form adapted for transportation and the converted measuring standard quantity is sent to a remote place. After the converted measuring standard quantity reaches the place, it is restored to the original measuring standard quantity, thus enabling calibration. The result of the calibration is certified.

33 Claims, 7 Drawing Sheets

OTHER PUBLICATIONS

Hale et al., Frequency Response Metrology for High-Speed Optical Receivers, National Institute of standards and technology, date unknown.*

Hirai et al., Remote Calibration of End Standards Using a Low-Coherence Tandem Interferometer With an Optical Fiber, 2003, Optics Communications, pp. 25-30.*

* cited by examiner

MEASURING-INSTRUMENT REMOTE-CALIBRATION SYSTEM AND MEASURING-INSTRUMENT REMOTE-CALIBRATION METHOD

CROSS-REFERENCE TO RELATED APPLICATION

This application claims the benefit of Japanese Patent Application 2003-123782, filed Apr. 28, 2003 in the Japanese Patent Office, the entire disclosure of which is incorporated herein by reference.

BACKGROUND OF THE INVENTION

1. Field of the Invention

The present invention relates to a measuring-instrument remote-calibration system and a measuring-instrument remote-calibration method.

2. Description of the Related Art

Figure 5:
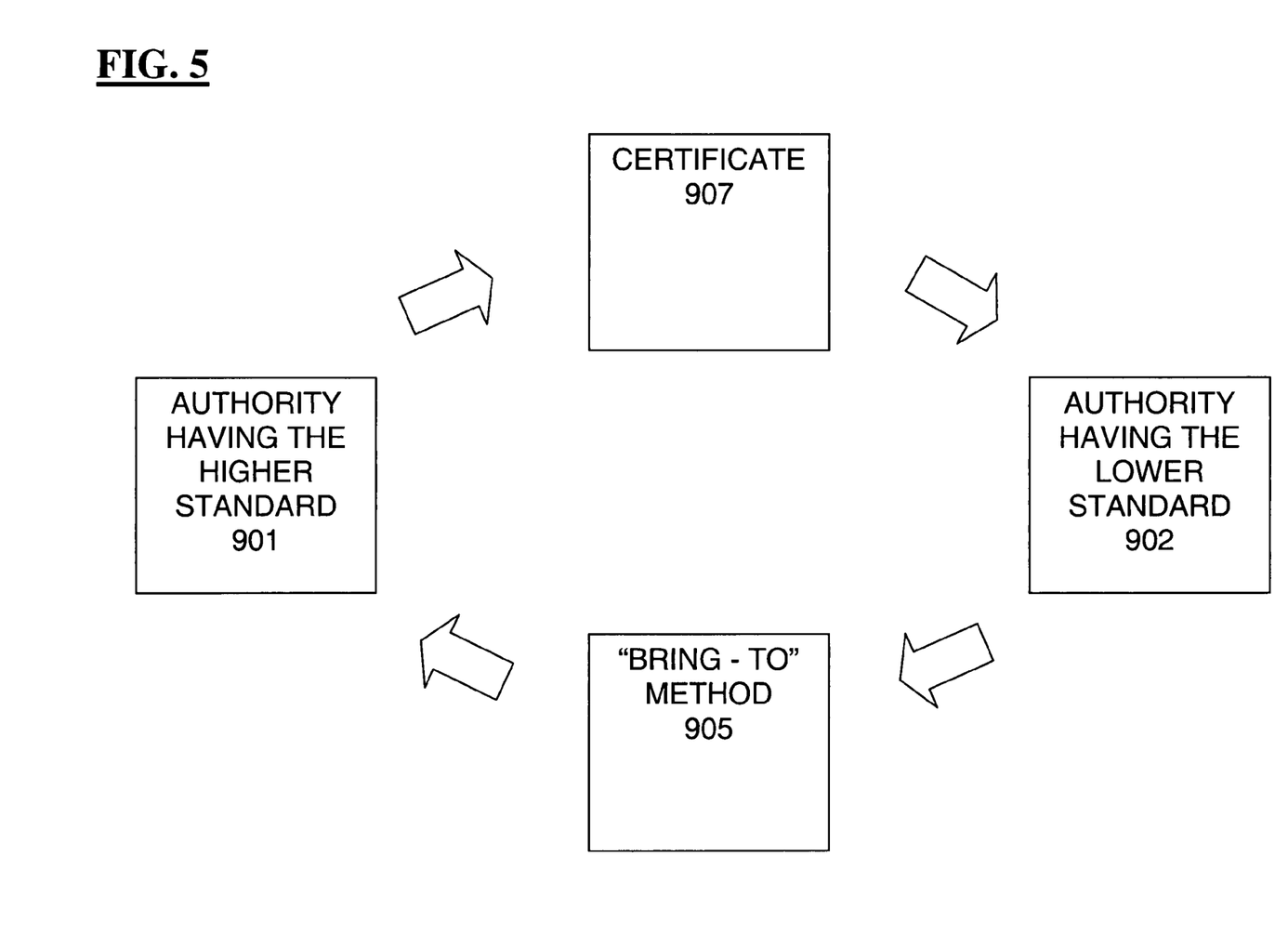
FIG. 5 is a block diagram of the related art "by-bringing" calibration method.

Generally, a system that supplies measuring standards to measuring instruments is called a "traceability system." In such a system of the related art, as shown in FIG. 5, the measuring standards are supplied in a "by-bringing" technique, which utilizes a so-called "hierarchy," in which a measuring standard having a lower accuracy 902 is brought to 905, and calibrated against, a measuring standard having a higher accuracy 901.

This technique is disclosed in, for example, "Denshi Keisoku (Electronic Measurement) (Kaitei-ban (Revised Edition))" written by Yasuo TSUZUKI, edited by the Institute of Electronics, Information and Communication Engineers (a Japanese incorporated body), and published by Corona Publishing Co., Ltd on Jan. 30, 2001 (see pages 23 and 24, FIG. 2.4 "Torehsabirithi Taikei (Traceability System)").

A calibration certificate 907 may then be issued from an authority having the higher standard 901 to an authority having the lower standard 902.

Generally, the "by-bringing" standard technique incorporates several layers of authorities, with the highest calibration authority being the respective national institute of metrology (or an equivalent body).

In Japan, such a measuring standard supply system is controlled by the Japan Calibration Service System (JCSS), and the highest calibration authority is the National Metrology Institute of Japan (NMIJ) in the National institute of Advanced Industrial Science and Technology. In the United States, the National Institute of Standards and Technology (NIST) is the highest calibration authority.

NIST currently is implementing a remote calibration research project called "SIMnet" ("SIM" means the Interamerican Metrology System and "net" represents calibration by using the Internet). In SIMnet, at the present stage, digital voltmeters capable of measuring electrical properties such as direct-current voltage, current, and resistance are calibrated by NIST and provided to various Central and South American countries that have no advanced national standard authorities. The digital voltmeters are then utilized to compare low level standards in those countries with the calibrated values and report any differences using the Internet.

However, exchanging calibrated results with the Central and South American countries is problematic. For example, problems result from the tightness of NIST's Internet security (e.g., firewalls), which is enforced to prevent cyberterrorism on information communication networks. Further, this system merely indicates the differences between the calibrated standards and the local standards, and thus cannot provide highly accurate measuring standards, such as those utilized in the "by-bringing" method discussed above, to the foreign countries remotely.

In fact, the present standard-supplying systems suffer from many disadvantages. Specifically, the hierarchical structure of the standard-supplying system is so strict that the system has difficulty in coping with a rapid social change. Also, due to the hierarchical structure, the lower layer has a respectively higher uncertainty. Additionally, the time required for calibration, that is, a time between acceptance of an instrument to be calibrated and issuance of a calibration certificate, is long. Further, because the standard-supplying system uses a so-called "by-bringing" standard supplying technique, a calibrated value is guaranteed only within a defined area and time of calibration. Accordingly, it is impossible to provide a calibration service to a non-local entity, such as a manufacturing plant of a domestic company that is located overseas.

SUMMARY OF THE INVENTION

In view of the above deficiencies, it is an object of the present invention to provide: (1) a measuring instrument remote calibration system in which, by remotely supplying a reference for use in precise measurement in a metrological standard field, remote calibration and certification are performed; and (2) a remote measuring instrument calibration method for such a system.

According to one aspect of the present invention, a measuring instrument remote calibration system for calibrating a measuring instrument at a remote place is provided. The measuring instrument remote calibration system includes a converting unit at a standard authority which has a highly accurate standard, and which converts a physical standard used as a measuring reference into a transmission signal to be transmitted through a communication medium, and a calibrating unit at the remote place which receives and restores the transmission signal to the measuring reference, and which performs calibration on the measuring instrument based on the measuring reference. The standard authority performs certification in accordance with the results of a precise measurement involving an uncertainty evaluation based on the calibration.

One of a standard related to frequency information and a standard not related to the frequency information may be used as the physical standard.

According to another aspect of the present invention, a measuring instrument remote calibration system for calibrating a measuring instrument at a remote place is provided. The measuring-instrument remote-calibration system includes a transporting unit at a standard authority which has a highly accurate standard, and which transports one of a physical standard and a chemical standard, used as a measuring reference, or a physical transferer for transferring the physical standard or the chemical standard, and a calibrating unit at the remote place which receives one of the physical standard, the chemical standard, and the physical transferer, and which performs calibration on the measuring instrument based on one of the physical standard, the chemical standard, and the physical transferee. The standard authority performs certification in accordance with the result of precise measurement involving an uncertainty evaluation based on the calibration.

The measuring-instrument remote-calibration system may further include a remote calibrating network for linking the means at the standard authority and the means at the remote place, wherein confirmation of a calibrating operation and confirmation of the precision of the operation are performed by mutually monitoring identical standards retained by a plurality of authorities linked to the remote calibrating network.

According to another aspect of the present invention, a measuring instrument remote calibration method is provided which includes the steps of: converting, by a standard authority having a highly accurate standard, a physical standard used as a measuring reference into a transmission signal to be transmitted by a communication unit; transmitting the transmission signal by the communication unit; performing calibration based on the measuring reference obtained by receiving and restoring the transmission signal by a standard authority or an enterprise as a destination; and performing certification, by a standard authority having a higher accurate standard, in accordance with the result of precise measurement involving an uncertainty evaluation based on the calibration.

According to another aspect of the present invention, a measuring instrument remote calibration method is provided which includes the steps of: converting, by a standard authority having a highly accurate standard, a physical standard used as a measuring reference into a transmission signal to be transmitted by a communication unit; transmitting the transmission signal by the communication unit; performing calibration based on the measuring reference obtained by receiving and restoring the transmission signal by a standard authority or an enterprise as a destination; and performing certification, by the standard authority having the highly accurate standard, in accordance with the result of precise measurement involving an uncertainty evaluation based on the calibration.

According to another aspect of the present invention, a measuring instrument remote calibration method is provided which includes the steps of: transporting, to a remote measuring instrument, by a standard authority having a highly accurate standard, one of a physical standard and a chemical standard, used as a measuring reference, or a physical transferer for transferring the physical standard or the chemical standard; performing calibration on the remote measuring instrument based on one of the transported physical standard, chemical standard, and physical transferee; and performing certification, by the standard authority having the highly accurate standard, in accordance with the result of precise measurement involving an uncertainty evaluation based on the calibration.

When a standard is supplied directly from a higher standard authority to an authority in which calibration is performed (such as a testing lab or manufacturing plant), the number of layers constituting the supply of the standard is reduced.

The measuring instrument remote calibration method may further include the step of confirming a calibrating operation and the precision of the calibrating operation by forming a remote calibrating network for executing the measuring instrument remote calibration method, and performing mutual monitoring of identical standards retained by a plurality of authorities linked to the remote calibrating network.

In the step of performing the mutual monitoring, the mutual monitoring may be performed not only between standard authorities in one country, but also between standard authorities in different countries.

The standard authority having the highly accurate standard may be a higher level standard authority, and frequency information including optical frequency information and a physical quantity capable of being converted into frequency information may be transmitted by means of communication from the higher level standard authority and is restored to a measuring standard in a calibrated authority at a remote place in which calibration is performed, whereby calibration is performed, and in accordance with the result of the calibration, a certification result may be transmitted from the higher level standard authority to the calibrated authority by means of communication.

The higher level standard authority and the calibrated authority may be positioned at two points where a satellite is simultaneously observed, and each may perform frequency calibration by using, as a medium, a signal transmitted from a signal source in the satellite.

The higher level standard authority and the calibrated authority may be positioned at two positions where a satellite is simultaneously observed, and a frequency standard may be restored at the remote place by comparing a reference clock signal included in a signal source in the satellite and a frequency divided signal from a frequency controllable oscillator, and feeding back the frequency divided signal to the frequency controllable oscillator so that an error signal between both signals is zero.

The satellite may be one of a global positioning system satellite and a quasi-zenith satellite.

The reception of a plurality of pieces of frequency information from the satellite minimizes an error based on a radio wave propagation delay time caused by dielectric material including a cloud or water vapor positioned between a receiver on the ground and a radio wave transmitter provided in the satellite in a state in which the satellite is over the receiver.

Based on a frequency standard restored as the measuring standard, a physical quantity directly linked to a frequency may be restored by physical law.

A Josephson voltage may be used as the quantity directly linked to the frequency.

The restored frequency standard may be converted into a voltage standard, and based on the restored voltage standard, a physical quantity converted into a voltage may be remote calibrated.

In a higher level standard authority as the standard authority having the highly accurate standard, a physical standard may be generated by using a physical-standard generating means integrated with an optical communication path. The physical standard may be transmitted by the optical communication path to a calibrated authority at the remote place in which calibration is performed. Calibration may be performed by restoring the transmitted physical standard in the calibrated authority. In accordance with the result of the calibration, a certification result may be transmitted from the higher-level-standard authority to the calibrated authority by means of communication.

The standard authority having the highly accurate standard may be a higher level standard authority, and an interference signal, caused by a physical quantity used as a reference in the higher-level-standard authority, may be transmitted by an optical communication path to a calibrated authority at the remote place in which calibration is performed. Calibration may be performed by restoring the transmitted interference signal to a measuring standard in the calibrated authority. In accordance with the result of the calibration, a certification result may be transmitted from the higher-level-standard authority to the calibrated authority by means of communication.

An environment which is used as the physical transferer in the transportation and which affects a characteristic of the physical standard or the chemical standard may be monitored to make a record. Just after one of the transported physical standard, chemical standard, and physical transferer reaches a destination, a standard authority having a more highly accurate standard may analyze the record by means of communication, and may determine whether or not the environment in the record is within an appropriate range of transportation conditions that the characteristics required for the transferer are not impaired. When the result of calibration by the physical transferer is within an allowable range, the standard authority having the highly accurate standard may serve as a higher level standard authority, and may transmit the result of certification to the calibrated authority by communication.

A temperature, a humidity, an atmosphere, a vibrating acceleration, and a shock may be recorded as the environment in the transportation.

According to the present invention, as described above, by remote-supplying a reference quantity for precise measurement, remote calibration at a calibrated authority in which calibration is performed or a user's site in the industrial world, and certification of the calibration can be performed. In particular, according to the present invention, in the case of supplying a standard from a higher standard authority or an authority similar thereto to the calibrated authority or an enterprise, the number of layers constituting the supply of the standard can be reduced. Moreover, the reduced number of the layers can prevent an increase in uncertainty.

Also, according to the present invention, by performing real-time and inexpensive remote calibration on a measuring instrument, if needed, the cost of a mechanism for maintaining high accuracy of an internal reference generator in the measuring instrument can be greatly reduced. A conventional measuring instrument requires a high cost due to a mechanism for maintaining high accuracy of an internal reference generator for a long period.

Accordingly, the present invention provides many advantages. First, the calibration time is reduced, which allows the system to cope with rapid change in the industrial structure. Second, remote calibration enables on-site implementation of a high-level calibration service to an enterprise expanding overseas. Third, any increase in uncertainty of hierarchical measurement standard supply is eliminated by enabling direct supply of a national standard to the industrial world (i.e., testing labs and manufacturing plants) by means of communication technology. Fourth, complementing standards may be accessed by using networks around the world or each region (Asia, Europe, North and South Americas, etc.), even if all highly accurate standards are not provided in one country. Fifth, the ability to mutually monitor identical standards retained by a plurality of authorities linked to a remote calibration network is enabled, to allow the confirmation of normal operation of various standards. Sixth, by enabling a guarantee of a calibrated value at a user's side, the restriction a certain place and time period by the related art "by-bringing calibration" is eliminated.

DETAILED DESCRIPTION OF THE EXEMPLARY EMBODIMENTS

Exemplary embodiments of the present invention will now be described with reference to the accompanying drawings. The described exemplary embodiments are intended to assist the understanding of the invention, and are not intended to limit the scope of the invention in any way.

Figure 1A:
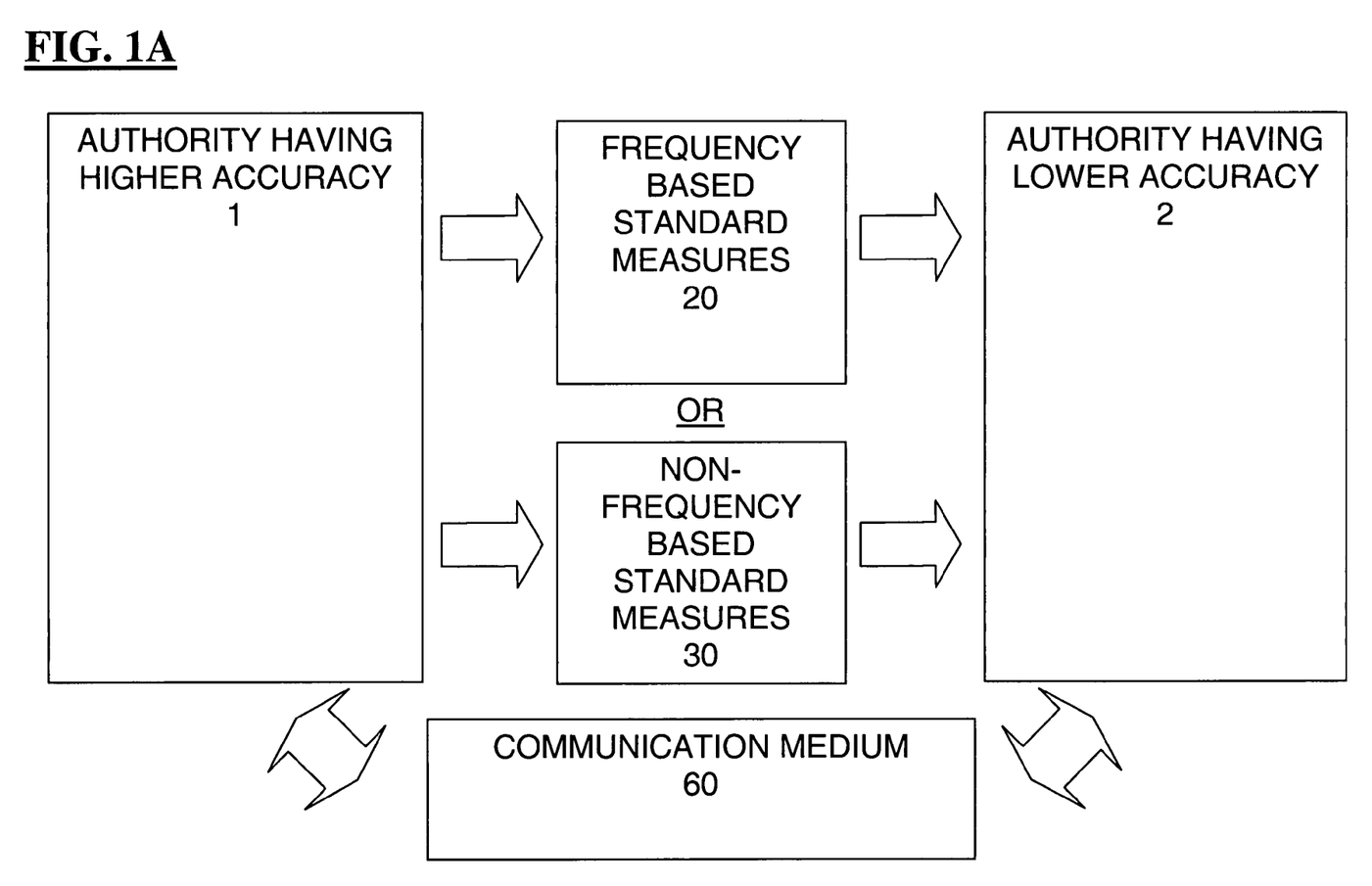
FIG. 1*a* is a block diagram of a general concept of remote calibration according to the invention.
Figure 1B:
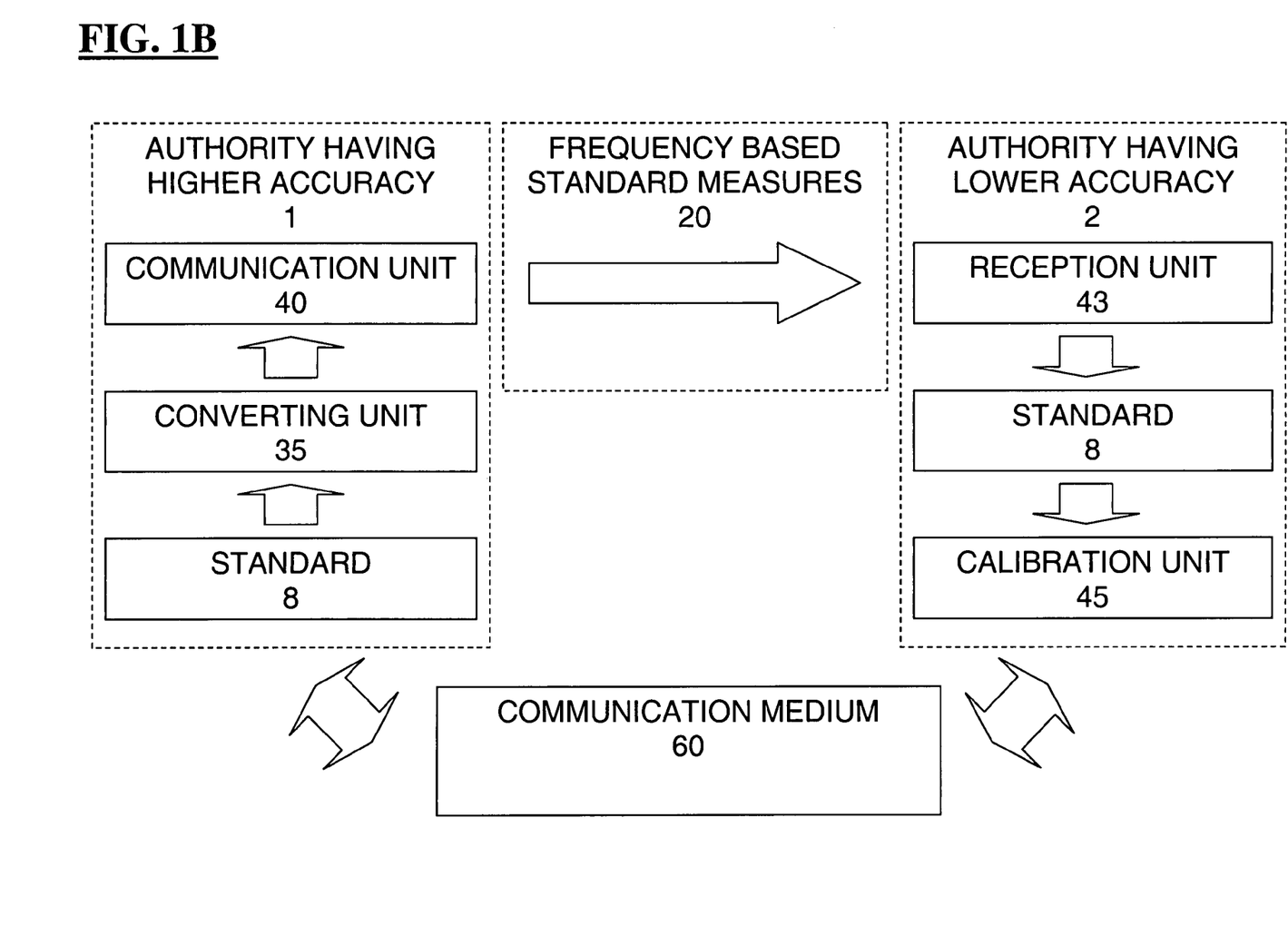
FIG. 1*b* is a block diagram of an exemplary embodiment for supplying a frequency based standard.
Figure 1C:
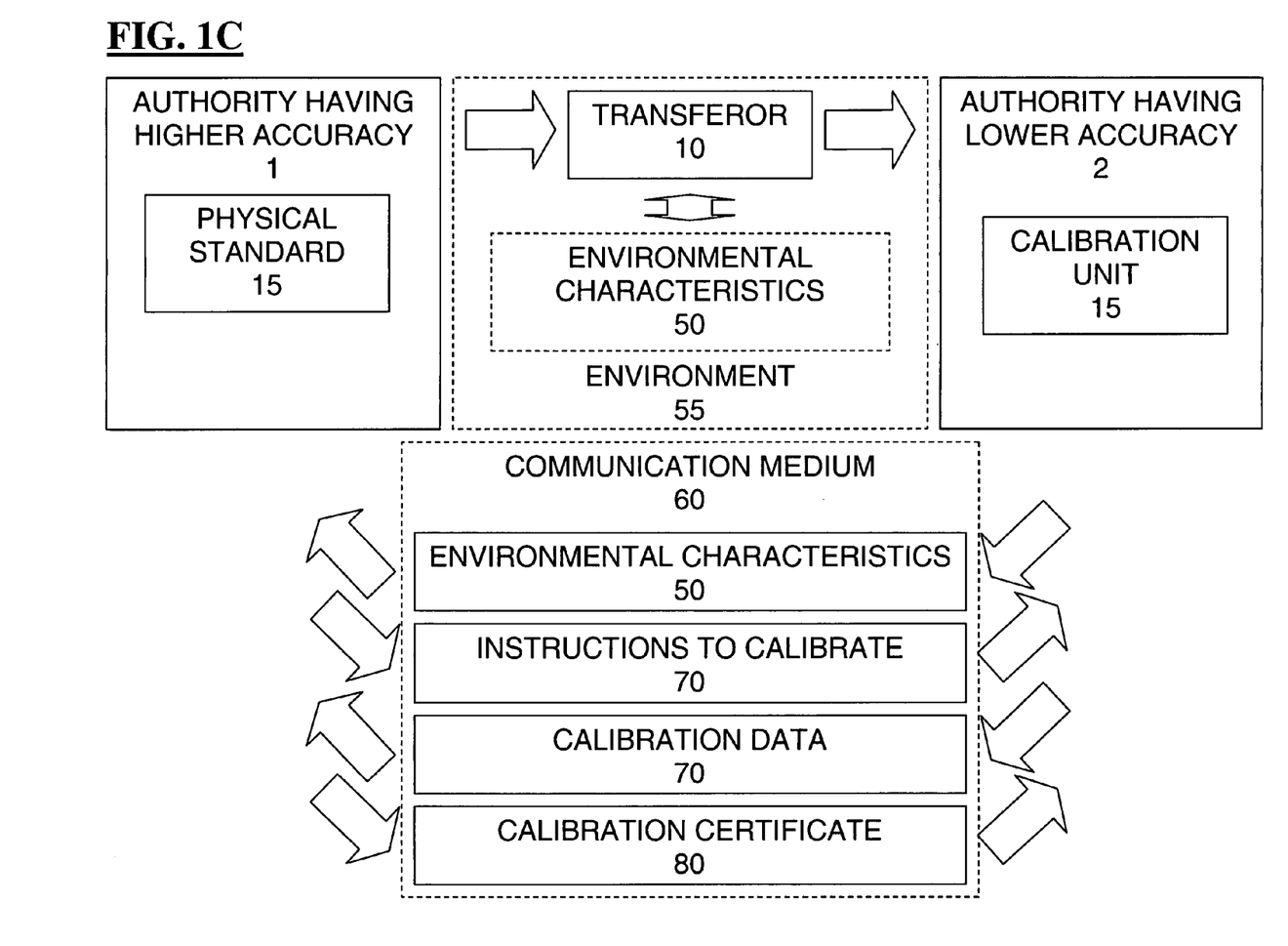
FIG. 1*c* is a block diagram of an exemplary embodiment for supplying a non-frequency based standard.

FIG. 1 is an illustration of a general concept of remote calibration according to the invention. More specifically, FIG. 1 is an illustration of a concept for inexpensively and accurately implementing a supply of a standard, which is a basis of a quality guarantee, by using information and telecommunication technologies such as the Internet, optical communication, or global positioning system (GPS) related technology.

FIG. 1A shows remote calibration from a higher standard authority 1 (e.g., the national standard authority or other authorized enterprise) which has a highly accurate standard, to a lower standard authority 2 (e.g., businesses, schools, or other standard authorities related to the national standard authority), which has a lower accuracy standard. Remote calibration using either a remote supply of frequency-based standard measures 20, or remote supply of non-frequency based standard measures 30 may be performed.

FIG. 1B shows remote calibration using frequency based measures 20 in more detail. When supplying frequency-based standard measures 20, the higher standard authority 1 utilizes converting unit 35 to convert a physical standard 8*a* (i.e., a standard of measurement) or quantity into a signal transmittable by a communication unit 40, and transmits the signal to a remote place by the communication unit 40. The lower standard authority 2 receives the signals and restores them to the standard of measurement 8*b*, whereby calibration (i.e., a precise measurement involving evaluation of uncertainty) can be performed by calibration unit 45. The result of the calibration may then be certified by the higher standard authority 1 having a more accurate standard.

FIG. 1C shows remote calibration using non-frequency based measures 20 in more detail. When supplying non-frequency based standard measures 30, a transferor 10, which contains the non-frequency based measure, and is little influenced by a transportation environment, is physically transported (i.e., carried or shipped) from the higher standard authority 1 to the lower standard authority 2. During this transport, the transferor 10 collects transportation environment characteristics 50 from the surrounding environment 55. After the transferor 10 reaches the lower standard authority 2, the collected environmental characteristics 50 are sent to the higher standard authority 1 by a communication medium 60 (e.g., the Internet, radio, satellite, etc.), and the higher standard authority 1 determines if the environmental characteristics are within an acceptable range. When it is determined that the environmental characteristics are acceptable by the higher standard authority 1, the higher standard authority 1 instructs the lower standard authority 2 to perform calibration. Calibration is then performed by calibration unit 45, and the calibration data 70 is sent to the higher standard authority 1. The higher standard authority 1 then determines whether the calibration data 70 is normal. If the calibration data 70 is normal, the higher standard authority immediately issues a calibration certificate 80 (i.e., it performs certification).

Frequency-Based Standard Measures

Figure 2:
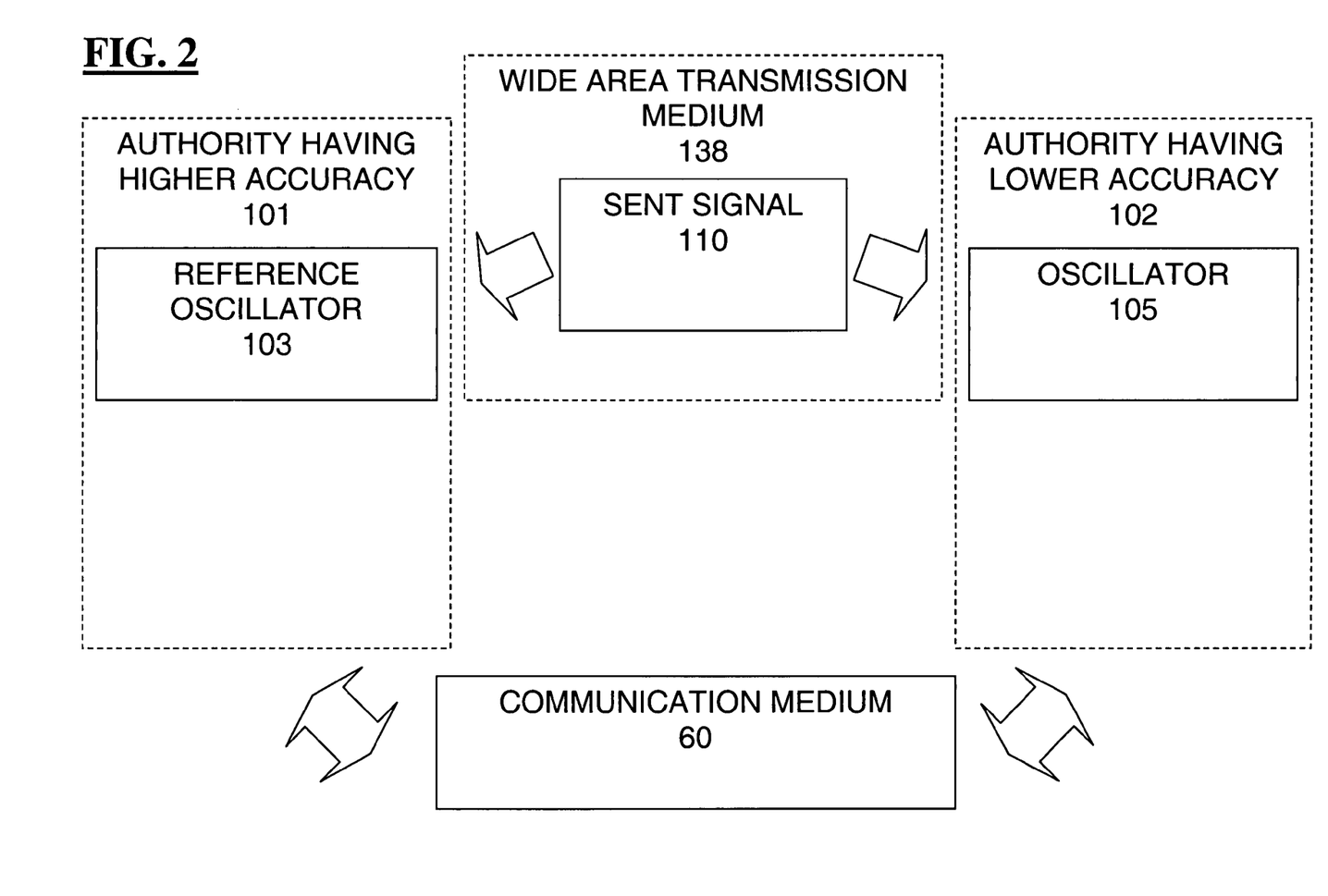
FIG. 2 is a block diagram of an exemplary embodiment for remote calibration of a time and a frequency.

FIG. 2 is an illustration of time-and-frequency remote calibration according to an exemplary embodiment of the invention for supplying frequency-based standard measures 20.

In this embodiment, a first frequency difference (b–f) between a frequency b of an oscillator 105 to be calibrated at a lower standard authority 102 and the frequency f of a sent signal 110 is obtained. The first frequency difference is compared to a second frequency difference (a–f) between a reference frequency a of a reference oscillator 103 at a higher standard authority 101 and the frequency f of the sent signal 110. The reference oscillator may be an atomic clock or other highly accurate device.

Thus, the frequency difference ((b–f)–(a–f)=b–a) may be obtained. This frequency difference represents a shift of frequency b of the oscillator with respect to frequency a of the reference oscillator. Accordingly, the oscillator at the lower standard authority 102 can be calibrated.

Additionally, when a wide area transmission medium 138 is used (such as a GPS satellite), a plurality of lower standard authorities 102 may receive the sent signals 110, and each lower standard authority may perform similar remote calibration of their respective oscillators 105 (or similar devices).

Figure 3:
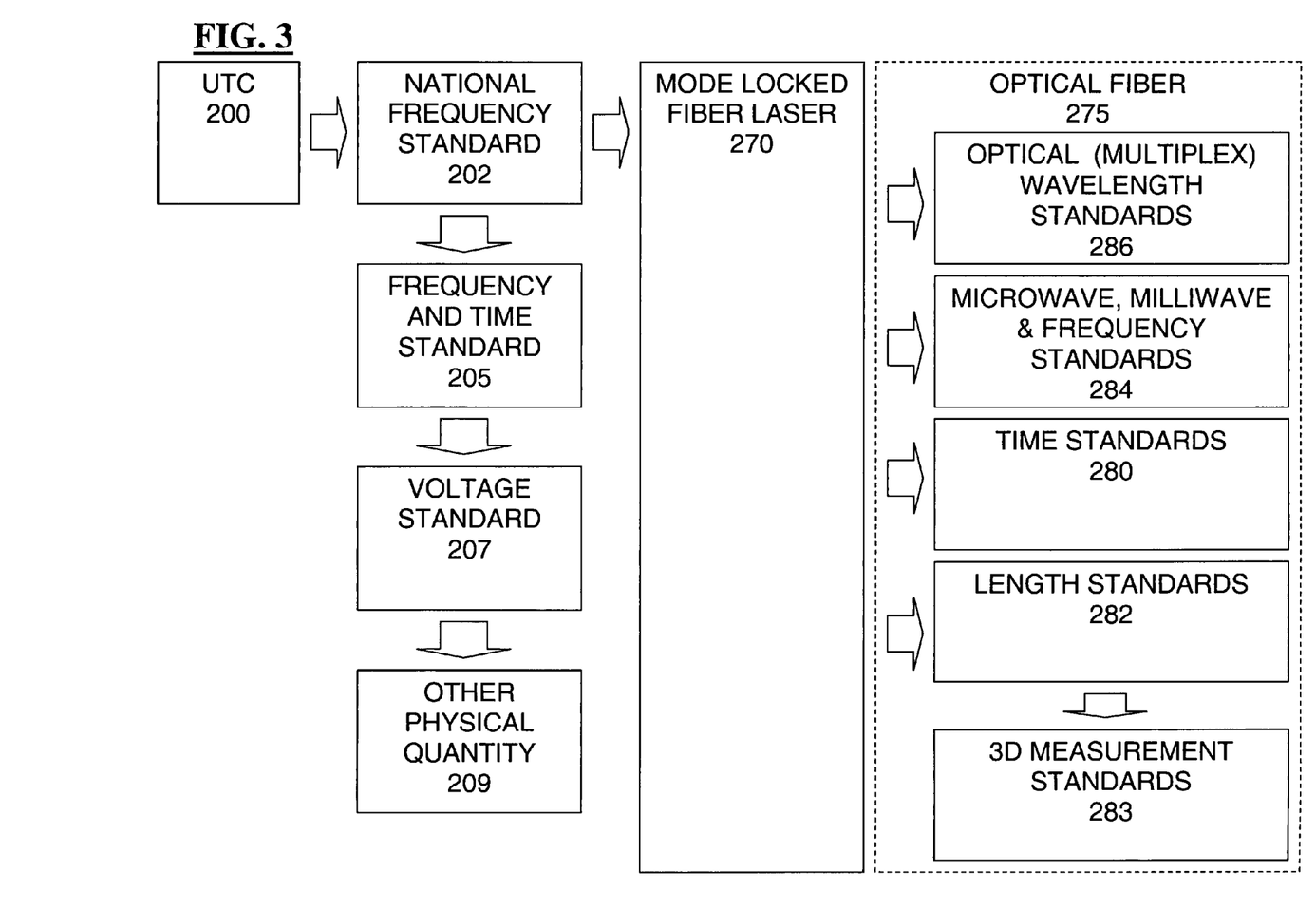
FIG. 3 is a block diagram of an exemplary embodiment showing frequency based standard supplying methods.
Figure 4:
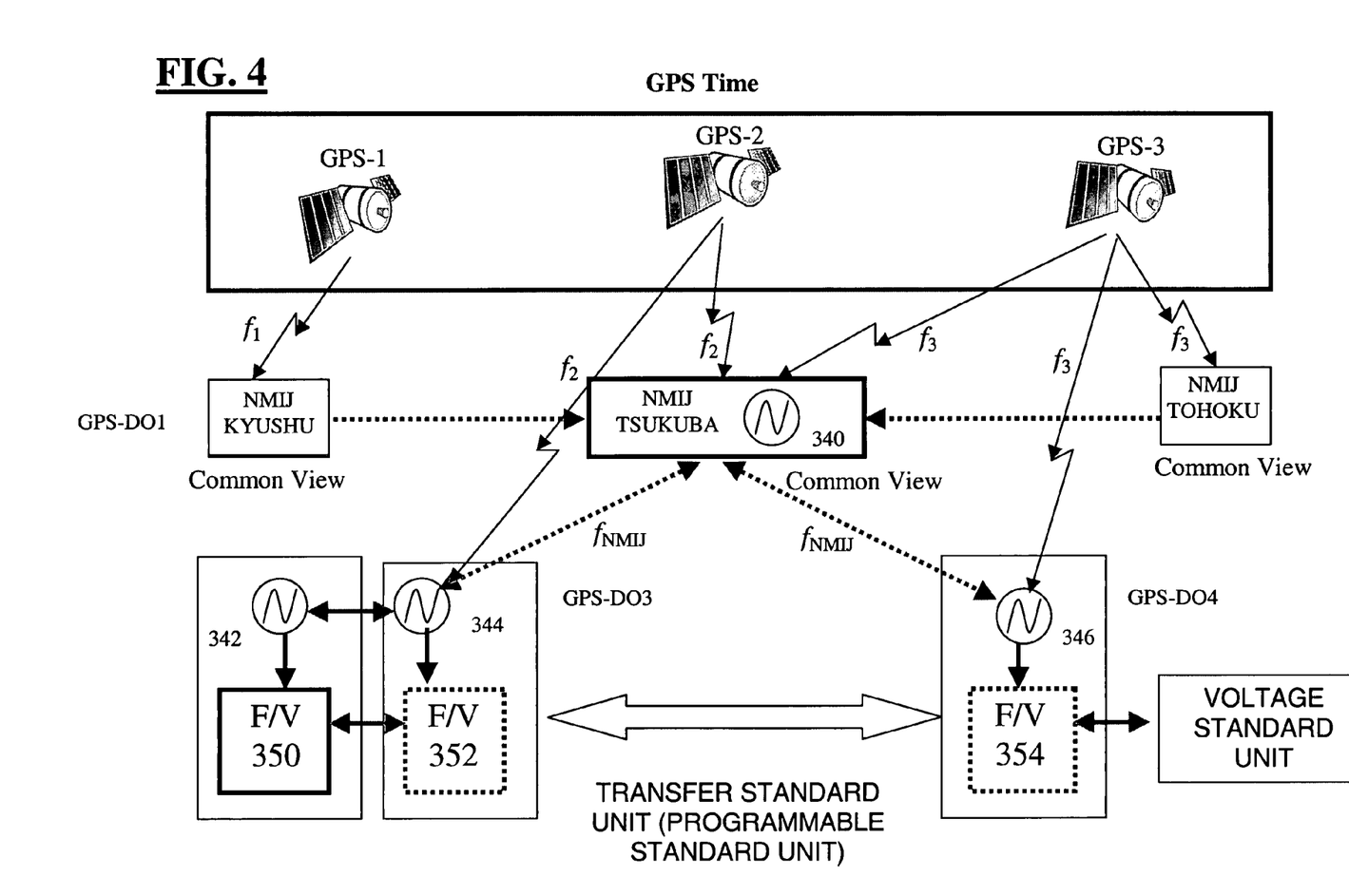
FIG. 4 is an illustration of an exemplary embodiment remote for supplying a voltage standard which is linked to remote supply of a frequency standard.

Another exemplary embodiment of the invention for supplying frequency-based standard measures 20 is shown in FIGS. 3 and 4. FIG. 3 is an illustration of a frequency-based method for supplying a standard. FIG. 4 is an illustration of remote supply of a voltage standard linked to remote supply of a frequency standard.

As shown in FIG. 3, data from frequency reference devices of major standard authorities (such as atomic clocks) around the world are collected and averaged to generate a coordinate universal time (UTC) 200 by the International Bureau of Weights and Measures (IBWM). Also, a national frequency standard 202 is calibrated (by the highest national authority) using the UTC and a GPS time (since frequency and time have a reciprocal relationship, determination of the time also determines the frequency). This information can be used to distribute a frequency and time standard 205, a voltage standard 207, or other physical quantities related to frequency 209, as described above in FIG. 1B.

As shown in FIG. 4, a frequency reference device can be calibrated using a GPS time and a frequency reference device complying with the national standard. GPS time can be obtained from GPS satellites GPS-1, GPS-2 and GPS-3, while the various frequency reference devices are oscillators 340, 342, 344 and 346. The national voltage standard is 350, and the transfer voltage standard units are 352 and 354.

A physical quantity accurately correlated to a frequency can then be generated in a calibrated frequency reference device. For example, a direct-current voltage (or the like) can be generated based on the quantum-mechanical Josephson effect. A quantized voltage derived by the Josephson effect is represented by the equation (Vn=nf/KJ-90), where Vn represents the n-th quantized voltage, n represents an integer, f represents the frequency of microwaves emitted to a Josephson junction in a superconductive state, and KJ-90 represents the Josephson constant. Thus, the quantized voltage is a physical quantity correlated to the frequency.

Also in FIG. 4, GPS-1, GPS-2, and GPS-3 denote GPS satellites which can be simultaneously observed from the earth (i.e., a Common View). A national institute of metrology uses several points (i.e., GPS-DO$_1$ and GPS-DO$_2$) to receive a frequency standard signal from the International Bureau of Weights and Measures (IBWM), and then determines a national frequency standard by performing an averaging operation.

Based on the national frequency standard, a similar method is used to calibrate a frequency standard for the lower accuracy authority. By applying this method to a reference frequency for obtaining the Josephson voltage standard (as discussed above), a voltage standard having consistency throughout the world may be established.

Additionally, other physical quantities that can be compared with a direct-current voltage accurately correlated to the above frequency (e.g., an alternating-current voltage correlated by a thermal converter) can be remote calibrated according to this embodiment.

Another exemplary embodiment of the invention for supplying frequency-based standard measures 20 is shown in the right hand portion of FIG. 3.

As shown in FIG. 3, by using a mode-locking fiber laser 270 in which a very short wavelength pulse beam is rotated while being synchronized with an external signal in an optical communication fiber loop, optical harmonic signals can be generated, which are called an "optical comb" since the form of the signals in the frequency domain resembles a comb.

A signal from a frequency-reference device calibrated by a GPS time may be used as the external signal with which the very-short-wavelength pulse beam is synchronized. The reciprocal of the thus resultant period of the very-short-wavelength pulse beam accurately determines intervals of the optical harmonic signals.

In addition, the optical harmonic signals are generated at regular intervals of the frequency (in general, a set of optical harmonic signals is called an optical harmonic signal group). Thus, by locking any of the signals in a stable molecular resonance absorption signal (e.g., a sharp near-infrared molecular resonance absorption signal, etc.), each of the signals is used as an accurate optical-frequency reference. The optical frequency reference may be "delivered" to any remote location by an optical communication fiber 275, and may be utilized as a frequency reference in optical wavelength multiplex communication and optical frequency measurement. In other words, these signals provide a remote supply of a calibrating reference signal to enable optical frequency remote calibration.

Since frequency and time have a reciprocal relationship, the supply of the signal is also a supply of time 280. Also, when an optical frequency interval is constant, the time period is also constant. Thus, the time 280 can also be "delivered" by using an optical fiber.

The beam can also be regarded as a near-infrared broadband beam source including optical harmonics at regular intervals. Accordingly, by using the above beam source for a length-measuring interferometer (e.g., an interferometer in which two low-coherence interferometer units are disposed in series), remote supply (remote calibration) of a length standard 282 can be performed.

By using an optical filter to extract two adjacent spectra from the optical harmonic signal, which reaches the remote place through the optical fiber, a frequency corresponding to the reciprocal of the period of the very short pulse beam can be restored. Since the period of the very short pulse beam is originally synchronized with a frequency-reference unit, at the remote place, the frequency of the frequency-reference unit or a frequency which is an integer multiple of the frequency reference can be restored, thus enabling remote calibration of a frequency standard 284.

Additionally, for remote supply of a frequency standard, remote calibration having enhanced reliability may be performed by using two separate channels. In other words, one may use a first channel in which a GPS signal propagates in a space, and a second channel in which a mode-locking laser signal is transmitted to a destination by an optical fiber and the frequency standard is restored by using an optical filter to extract two adjacent spectra at the destination.

Non-Frequency Based Standard Measures

The remote supply of non-frequency based standard measures 30 shown in FIG. 1C and briefly discussed above is described below in more detail.

Many standard measures are physical quantities that cannot be related to frequencies, and thus cannot be supplied via a frequency transmission. Accordingly, these standard measures may be remotely provided by using a transferor that is robust against various transportation. It should be noted that, when such a transferor is transported over a long distance, the characteristics of the standard measure may be affected by changes in environment, such as temperature, humidity, vibration, and acceleration, which thereby increases uncertainty.

Thus, in the case of remote supply of a non-frequency based physical standard 15 from a higher standard authority 1 to a lower standard authority 2, a transferor 10 (transfer standard unit) for each type of standard measure must be transported between the two authorities. During the transportation, an environment 55 in which the transportation takes place is monitored to record environmental characteristics 50 (e.g., temperature, humidity, atmosphere, vibrating acceleration, shock, etc.) which could affect the transferor 10 (and physical standard 15). After the transferor 10 reaches its final destination (the lower standard authority 2), the higher standard authority 1 immediately acquires and analyzes the recorded environment characteristics 50 by means of communication medium 60 (e.g., the Internet, a WAN, radio, etc.), and determines whether the recorded environmental characteristics 55 are within an appropriate range of transportation environment conditions.

When it is determined that the recorded environment is within an acceptable range (with respect to the normal characteristics of the transferer 10), the higher standard authority 1 instructs 90 the lower standard authority 2 that calibration may begin. The transferor 10 is then used by calibration unit 45 to perform a calibrating operation at the lower authority 2. Calibration data 70 is then sent to the upper authority 1 by the communication medium 60. The upper authority 1 then determines whether the calibration data 70 is within an expected range of calibrated values.

When the calibration data 70 is within the expected range, certification is immediately performed via the communication medium 60, and a calibration certificate 80 may be provided by the higher authority 1 to the lower authority 2.

Additionally, after calibration, the transferor 10 may then be returned to the higher standard authority 1 for re-calibration of the standard measure (for example, if the recorded environment was outside of the acceptable range).

The transferor 10 may be a container box specially designed for protection against disturbances occurring during transportation, such as vibration, temperature, humidity, and pressure. The transferor 10 may also be specially designed to afford a relatively higher amount of protection for a particularly weak parameter of the measurement standard unit being transferred. A digital recorder (data logger) for constantly recording the environmental parameters may also be included in the container box.

In any of the above exemplary embodiments, accuracy of various standards may be monitored by utilizing a communication medium for remote calibration. Specifically, measuring standards retained in each national authority may be monitored by other national authorities (or an international authority). In other words, constant mutual monitoring of various national authorities can be performed, and any standard that is out of order or reduced in accuracy can be identified, and the respective national authority can be alerted.

Further, measuring standards retained in a national authority can be constantly complemented by other national authorities (or an international authority). In other words, when the standard in a first authority deteriorates in accuracy, a mean value obtained from the standards of the other authorities may be obtained, and the accuracy of the standard in the first authority can be maintained.

SPECIFIC EXAMPLES

Various elements and technologies useful for implementing the above exemplary embodiments include the following examples.

Regarding development of time standard remote calibration technology, remote frequency calibration using a GPS signal is broadly divided into two different methods. In a "common view" method, the higher standard authority 1 and lower standard authority 2 observe the same GPS satellite (or a satellite similar thereto), and a signal received from the satellite is used as a medium by each one. Alternatively, an error signal between a signal obtained by dividing the frequency of an oscillator and a clock signal emitted from a GPS satellite (or a satellite similar thereto) is detected, and by negatively feeding back the signal to the oscillator so that the error signal is zero, an accurate frequency is obtained. In general, the common view method has a higher accuracy.

Regarding the development of length standard (wavelength) remote calibration technology, by using a mode-locking fiber laser to emit a very short pulse laser in an optical communication band having a wavelength of 1.5 μm, experiments of stabilizing an "optical comb", which is used as an optical frequency reference, and broadening the wavelength of the "optical comb" based on a nonlinear effect in a dispersion-shifted fiber, were performed. As a result, a spread spectrum of 1.3 to 1.7 μm was confirmed. By using a passive optical-frequency comb, the accuracy of an "optical measure" in the communication band can be evaluated about how much accuracy a repetition frequency corresponding to a graduation of the measure has. An optical-frequency measuring system combined with an acetylene stabilized laser can have an uncertainty of 1 part per billion (ppb) to 0.1 ppb.

Regarding the development of length standard remote calibration technology in an optical fiber application, for the purpose of realizing remote calibration of a practical length-standard unit, two low-coherence optical interferometers (two connected interferometer units each using an optical beam source having a broad spectrum width) were produced. By using 3 km length single-mode optical fiber to transmit interference information based on a super luminescent diode beam (in the vicinity of a wavelength of 800 nm), measurement of a block gauge having a nominal dimension of 5 cm can be performed with an accuracy of 0.1 μm.

Regarding development of length standard remote calibration technology using an iodine stabilized He—Ne laser, in order to control an iodine stabilized He—Ne laser by using a communication network, an analog/digital switching control circuit was developed. In each of analog and digital forms, an absorption signal of iodine was confirmed, and it was confirmed that frequency stabilization was possible.

Regarding development of electric standard (DC) remote calibration technology, an integrated circuit composed of 32,768 NbN/TiN/NbN Josephson junctions capable of operating at a temperature of 10K was developed. Also, a small refrigerator/cooler for generating a temperature of 10K was developed. By combining the integrated circuit and the refrigerator/cooler, and emitting 16-GHz microwaves, a Josephson voltage of 1 V was obtained. Based on this fact, system formation concerning a Josephson voltage standard can be implemented.

Regarding development of electric-standard (AC) remote calibration technology, an AC-DC standard calibrating system can be realized which is constituted by a thermoelectric AC-to-DC converter, a high-resolution electromotive-force detecting circuit, a fast reversed DC circuit, a precision digital sinusoidal generating circuit, and an arithmetic processing unit.

Regarding development of radiation standard remote calibration technology, it is possible to perform remote calibration of gaseous radioactive material standards such as Kr-85 and Xe-133 in order to expand a radiation-standard supply range. Accordingly, by using a gas counter device for absolute measurement of gaseous radioactive material, a radioactive gas must be measured with high accuracy. By using this gas to perform comparative calibration on an (specific secondary) ionization chamber system retained by an authorized enterprise, remote calibration can be performed similarly to the case of other gamma ray species, thus establishing traceability of a gaseous radioactive material standard, whose carriage and encapsulation are difficult, and contributing to expanded supply of the standard.

Regarding development of remote calibration technology for three dimensional measuring machines, it was confirmed that, when two coordinate measuring machines (CMMs) of the same type were used, one CMM was able to remote-control all the functions of the other CMM by using the Internet. By using this system of CMMs and a live camera system, basic data for calculating uncertainty by using a ball plate was obtained.

Regarding development of flow standard remote calibration technology, measurement data and image data which are collected by national flow standard equipment (large petroleum flow calibration equipment) can be sent online by the Internet to a laboratory at another place, and can be remote-calibrated.

Regarding development of temperature standard remote calibration technology, in order to develop a remote temperature standard calibration technology using the Internet, a platinum resistance thermometer having strong resistance against vibration and shock can be transferred. Regarding evaluation of thermocouple temperature distribution characteristics, by using a thermocouple temperature distribution characteristics evaluator to determine the position and size of an inhomogeneity in a portion of a wire of each thermocouple, uncertainty of temperature measurement which is caused by a difference in temperature distribution of a furnace can be evaluated at a resolution of 0.1 μV or less.

Regarding development of mechanics standard remote calibration technology, for remote calibration of a pressure standard, a high-precision digital pressure indicator (for an atmosphere pressure) of a silicon resonance type was transferred. The stability of a zero point of the indicator was increased by replacing a seal portion of the indicator with an identical one made of metal. Evaluation of the actual performance of the indicator was implemented by using a local area network.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A measuring-instrument remote-calibration system for remotely calibrating a measuring instrument, comprising:
   converting means for converting a physical standard used as a measuring reference into a transmission signal and for transmitting the signal through a first communication medium; and
   calibrating means for receiving and restoring the transmission signal to the measuring reference, and for performing calibration on the measuring instrument based on the measuring reference,
   wherein the converting means is located at a standard authority, the calibrating means is located at a remote location, and the standard authority provides certification of the calibration.

2. A measuring-instrument remote-calibration system according to claim 1, wherein results of the calibration are sent from the remote location to the standard authority via a second communication medium.

3. A measuring-instrument remote-calibration system according to claim 2, wherein the first and second communication mediums are the same.

4. A measuring-instrument remote-calibration system according to claim 2, wherein the first and second communication mediums are different.

5. A measuring-instrument remote-calibration system according to claim 1, wherein:
   the converting means comprises a converting unit and a communication unit located at a standard authority; and
   the calibrating means comprises a reception unit and a calibration unit located at a remote location.

6. A measuring-instrument remote-calibration system according to claim 1, wherein the standard authority is the highest national calibration authority.

7. A measuring-instrument remote-calibration system according to claim 1, wherein the remote location is located overseas, relative to the standard authority.

8. A measuring-instrument remote-calibration system according to claim 1, wherein the physical standard is related to frequency information.

9. A measuring-instrument remote-calibration system for remotely calibrating a measuring instrument, comprising:
   converting means for converting a physical standard used as a measuring reference into a transmission signal and for transmitting the signal through a first communication medium;
   calibrating means for receiving and restoring the transmission signal to the measuring reference, and for performing calibration on the measuring instrument based on the measuring reference, wherein the standard authority performs the certification in accordance with the result of precise measurement involving uncertainty evaluation based on the calibration.

10. A measuring-instrument remote-calibration system according to claim 9, wherein the physical standard is related to frequency information.

11. A measuring-instrument remote-calibration system for remotely calibrating a measuring instrument, comprising:
converting means for converting a physical standard used as a measuring reference into a transmission signal and for transmitting the signal through a first communication medium;
calibrating means for receiving and restoring the transmission signal to the measuring reference, and for performing calibration on the measuring instrument based on the measuring reference; and
a remote calibrating network for linking the standard authority and the remote place,
wherein a confirmation of the calibration operation and a confirmation of the precision of the standard are performed by mutually monitoring identical standards retained by a plurality of authorities linked to said remote calibrating network.

12. A measuring-instrument remote-calibration system according to claim 11, wherein the physical standard is related to frequency information.

13. A measuring instrument remote calibration method comprising the steps of:
converting a physical standard used as a measuring reference into a transmission signal;
transmitting the transmission signal by a communication means;
receiving the transmission signal;
restoring the measuring reference from the transmission signal; and
performing calibration based on the measuring reference;
performing certification, in accordance with results of the calibration, wherein:
the steps of converting a physical standard and performing certification are performed at a standard authority; and
the steps of restoring the measuring reference and performing calibration are performed at a remote location.

14. A measuring instrument remote calibration method according to claim 13, further comprising transmitting results of the calibration from the remote location to the standard authority; and transmitting a certification certificate from the standard authority to the remote location.

15. A measuring instrument remote calibration method according to claim 13, wherein the steps of transmitting the transmission signal, transmitting results of the calibration, and transmitting a certification certificate are all performed within a single type of communication medium.

16. A measuring instrument remote calibration method according to claim 13, wherein the steps of transmitting the transmission signal, transmitting results of the calibration, and transmitting a certification certificate are performed within various types of communication mediums.

17. A measuring instrument remote calibration method according to claim 13, wherein the standard authority is the highest national calibration authority.

18. A measuring instrument remote calibration method according to claim 13, wherein the remote location is located overseas, relative to the standard authority.

19. A measuring instrument remote calibration method according to claim 13, wherein the step of performing certification is accomplished in accordance with the result of precise measurement involving uncertainty evaluation based on the step of performing calibration.

20. A measuring-instrument remote-calibration method according to claim 13 wherein:
the standard authority stores highly accurate standards;
the measuring reference is frequency based; and
the certification result is transmitted from the standard authority to the remote location by a communication medium.

21. A measuring instrument remote calibration method according to claim 20, wherein the standard authority and the remote location:
are positioned so that a satellite is simultaneously observed; and
perform frequency calibration by utilizing a signal transmitted from a signal source in the satellite.

22. A measuring instrument remote calibration method according to claim 20, wherein the standard authority and the remote location:
are positioned so that a satellite is simultaneously observed; and
the frequency standard is restored at the remote location by comparing a reference clock signal included in a signal source in the satellite and a frequency-divided signal from a frequency-controllable oscillator, and feeding back the frequency-divided signal to the frequency-controllable oscillator so that an error signal between both signals is zero.

23. A measuring-instrument remote-calibration method according to claim 20, wherein, in the step of restoring the measuring reference, a physical quantity directly linked to the frequency is restored by physical law at the remote location.

24. A measuring-instrument remote-calibration method according to claim 20, wherein, in the step of restoring the measuring reference, the restored frequency standard is converted into a voltage standard, and based on the restored voltage standard, a physical quantity converted into a voltage is remote-calibrated.

25. A measuring-instrument remote-calibration method according to claim 21, wherein the satellite is one of a global positioning system satellite and a quasi-zenith satellite.

26. A measuring-instrument remote-calibration method according claim 21, wherein reception of a plurality of pieces of frequency information from the satellite minimizes an error based on a radio wave propagation delay time caused by dielectric material including a cloud or water vapor positioned between a receiver on the ground and a radio wave transmitter provided in the satellite in a state in which the satellite is over the receiver.

27. A measuring-instrument remote-calibration method according to claim 22, wherein the satellite is one of a global positioning system satellite and a quasi-zenith satellite.

28. A measuring-instrument remote-calibration method according to claim 22, wherein reception of a plurality of pieces of frequency information from the satellite minimizes an error based on a radio wave propagation delay time caused by dielectric material including a cloud or water vapor positioned between a receiver on the ground and a radio wave transmitter provided in the satellite in a state in which the satellite is over the receiver.

29. A measuring-instrument remote-calibration method according to claim 23, wherein a Josephson voltage is used as the quantity directly linked to the frequency.

30. A measuring instrument remote calibration method comprising:

converting a physical standard used as a measuring reference into a transmission signal;

transmitting the transmission signal by a communication means;

receiving the transmission signal;

restoring the measuring reference from the transmission signal;

performing calibration based on the measuring reference; and confirming the precision of the calibration by performing mutual monitoring of identical standards retained by a plurality of standard authorities linked to a remote calibrating network.

31. A measuring-instrument remote-calibration method according to claim 30 wherein, in the step of performing the mutual monitoring, the mutual monitoring is performed between standard authorities nationally and internationally.

32. A measuring-instrument remote-calibration method, comprising:

generating a physical standard in a standard authority that stores highly accurate standards by using a physical standard generating means integrated with an optical communication path;

transmitting the physical standard by the optical communication path to a calibrated authority at the remote place in which calibration is performed;

performing calibration by restoring the transmitted physical standard in the calibrated authority; and transmitting a certification result, in accordance with the result of the calibration, from the authority to the calibrated authority by the communication means.

33. A measuring-instrument remote-calibration method according to claim 32, wherein:

the standard authority is a higher-level-standard authority, and an interference signal, caused by a physical quantity used as a reference in the higher-level-standard authority, is transmitted by an optical communication path to a calibrated authority at the remote place in which calibration is performed;

calibration is performed by restoring the transmitted interference signal to a measuring standard in the calibrated authority; and in accordance with the result of the calibration, a certification result is transmitted from the higher-level-standard authority to the calibrated authority by the communication means.

* * * * *